(No Model.)

J. F. REHM.
FRUIT CUTTING AND PITTING MACHINE.

No. 569,838.

4 Sheets—Sheet 3.

Patented Oct. 20, 1896.

Witnesses:
Inventor:
Jacob F. Rehm,
By Dyrenforth & Dyrenforth,
Attys.

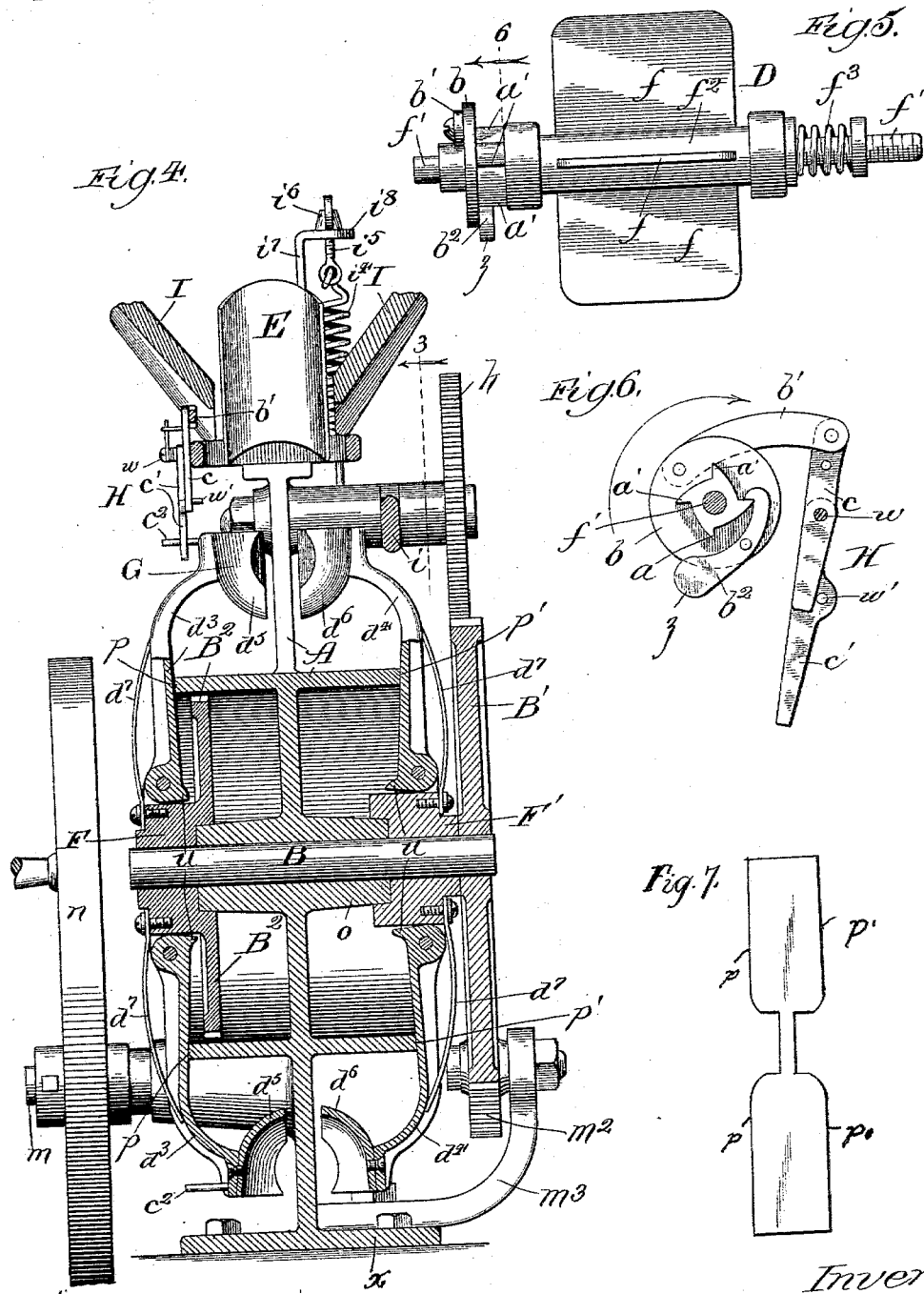

UNITED STATES PATENT OFFICE.

JACOB F. REHM, OF CHICAGO, ILLINOIS.

FRUIT CUTTING AND PITTING MACHINE.

SPECIFICATION forming part of Letters Patent No. 569,838, dated October 20, 1896.

Application filed December 1, 1894. Serial No. 530,573. (No model.)

*To all whom it may concern:*

Be it known that I, JACOB F. REHM, a citizen of the United States, residing at Chicago, in the county of Cook and State of Illinois, have invented a new and useful Improvement in Fruit Cutting and Pitting Machines, of which the following is a specification.

My invention relates to an improvement in the class of machines adapted for dividing, preparatory to desiccating and pitting, such fruit as the peach, apricot, plum, and the like; and it relates particularly to an improvement over a machine for the same purpose for which Letters Patent of the United States No. 517,588 were issued to me, dated April 3, 1894.

The principle of construction involved in my aforesaid former machine is that of the pivotal oscillating-arm form of carrier for the sectional cup, which is carried by the movement of the arms carrying the separable cup-sections back and forth through the arc of a circle between the feed and discharge past the cutters. In the practical application of the machine it was found to be unsatisfactory in several particulars, all of which are attributable to the aforesaid principle of its construction, by reason of which, to attain the requisite sweep of the cup-sections across the cutters from the feed to the discharge, a length of the arms is required which precludes not only the possibility of compactness in the structure, but renders the mechanism necessarily frail and liable to get out of order, and thus unreliable in use and ineffective. This same difficulty is encountered in fruit cutting and pitting machines in which the travel of the cups is through an elongated endless path past the cutters, in the manner of a flexible conveyer formed with endless conveyer-chains carrying buckets. Moreover, according to my said former construction it is impossible to employ practically in one machine more than one cup, whereby the operation is necessarily rendered slow.

The object of my present invention is to provide a generally-improved construction of fruit cutting and pitting machine whereby the objections pointed out as appertaining to my formerly-patented machine shall be overcome in a manner affording a machine for the purpose of peculiarly compact, solid, and simple construction, rendering it expeditious and reliable in its operation.

Figure 1:
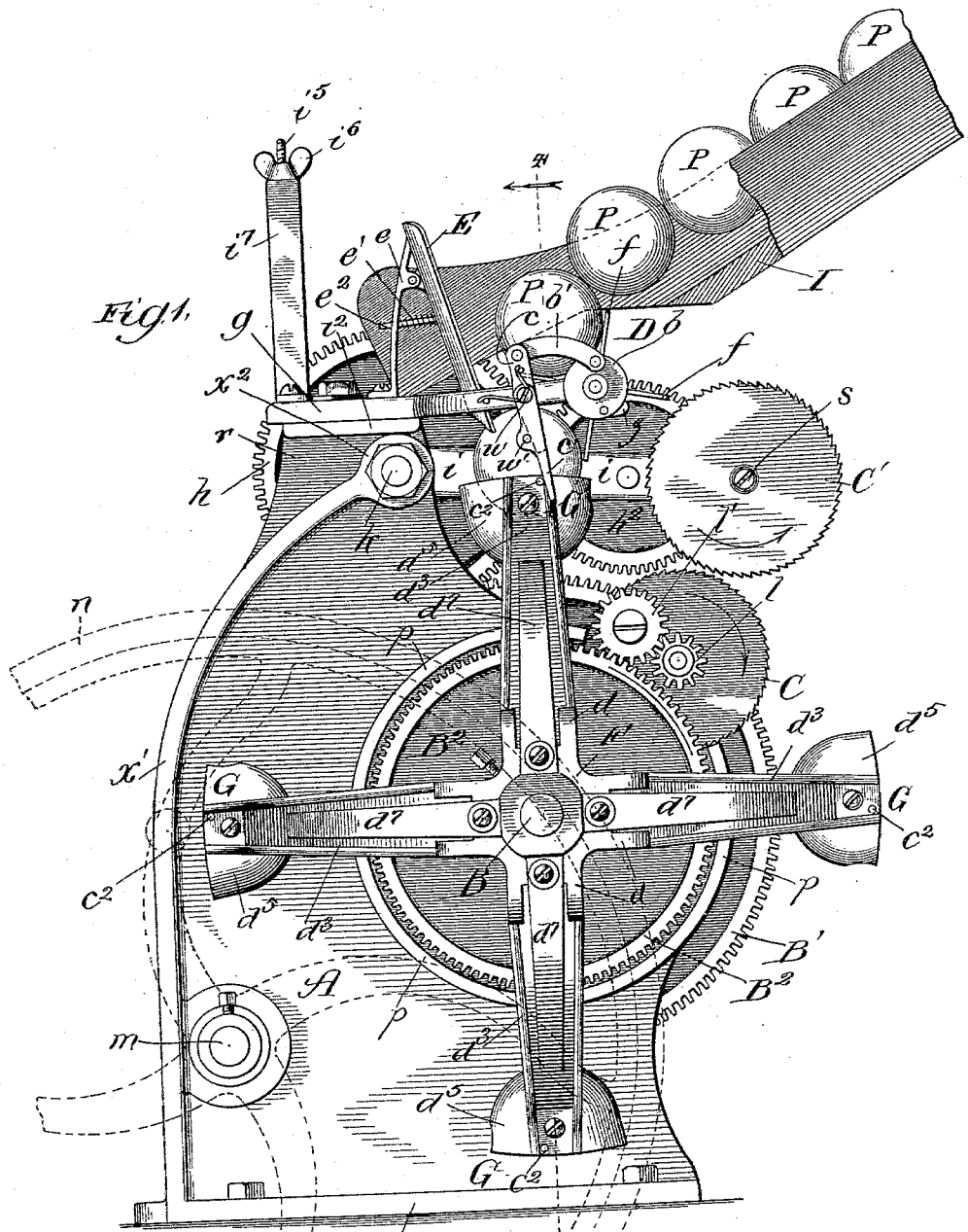
Figure 2:
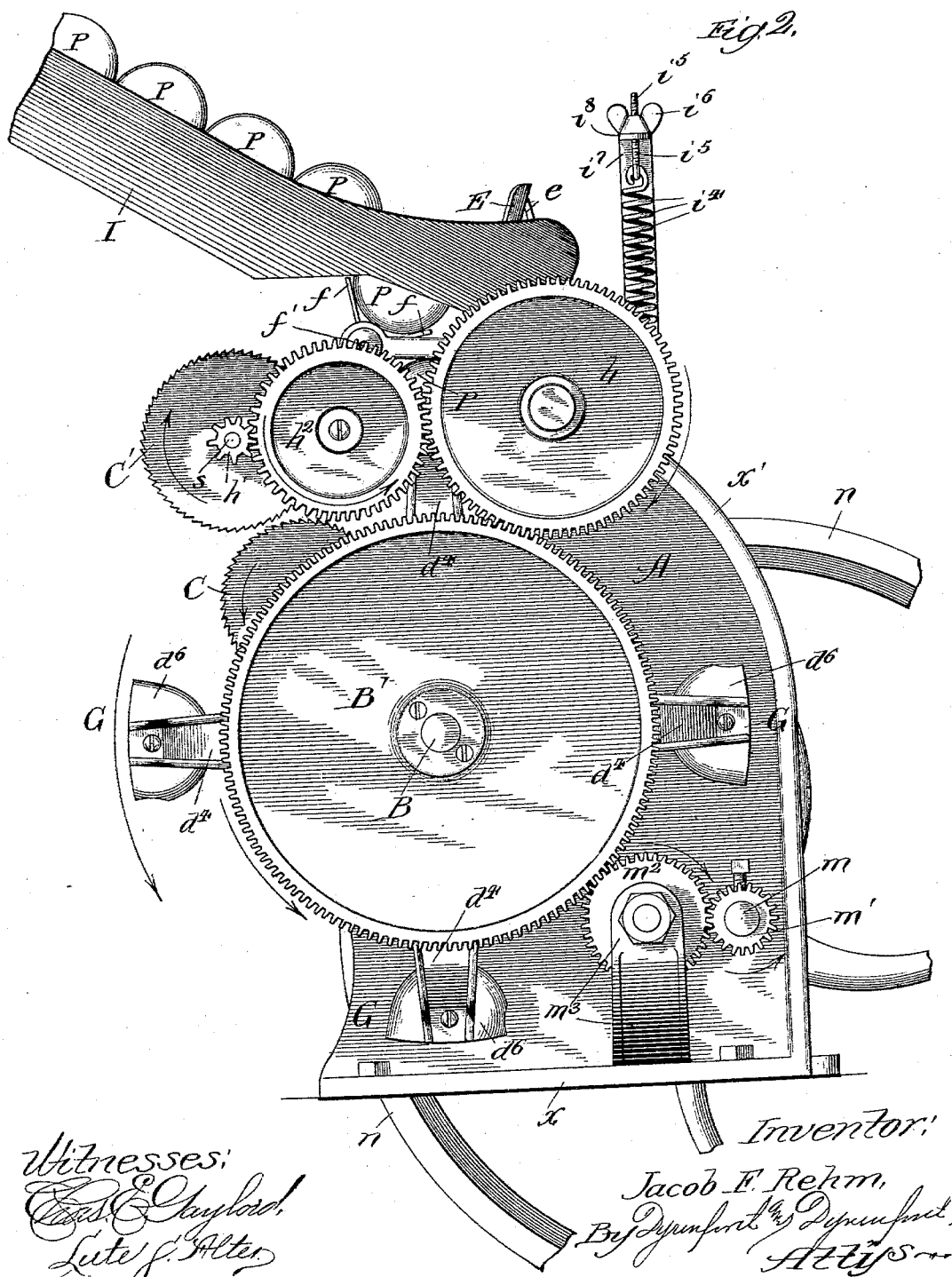
Figure 3:
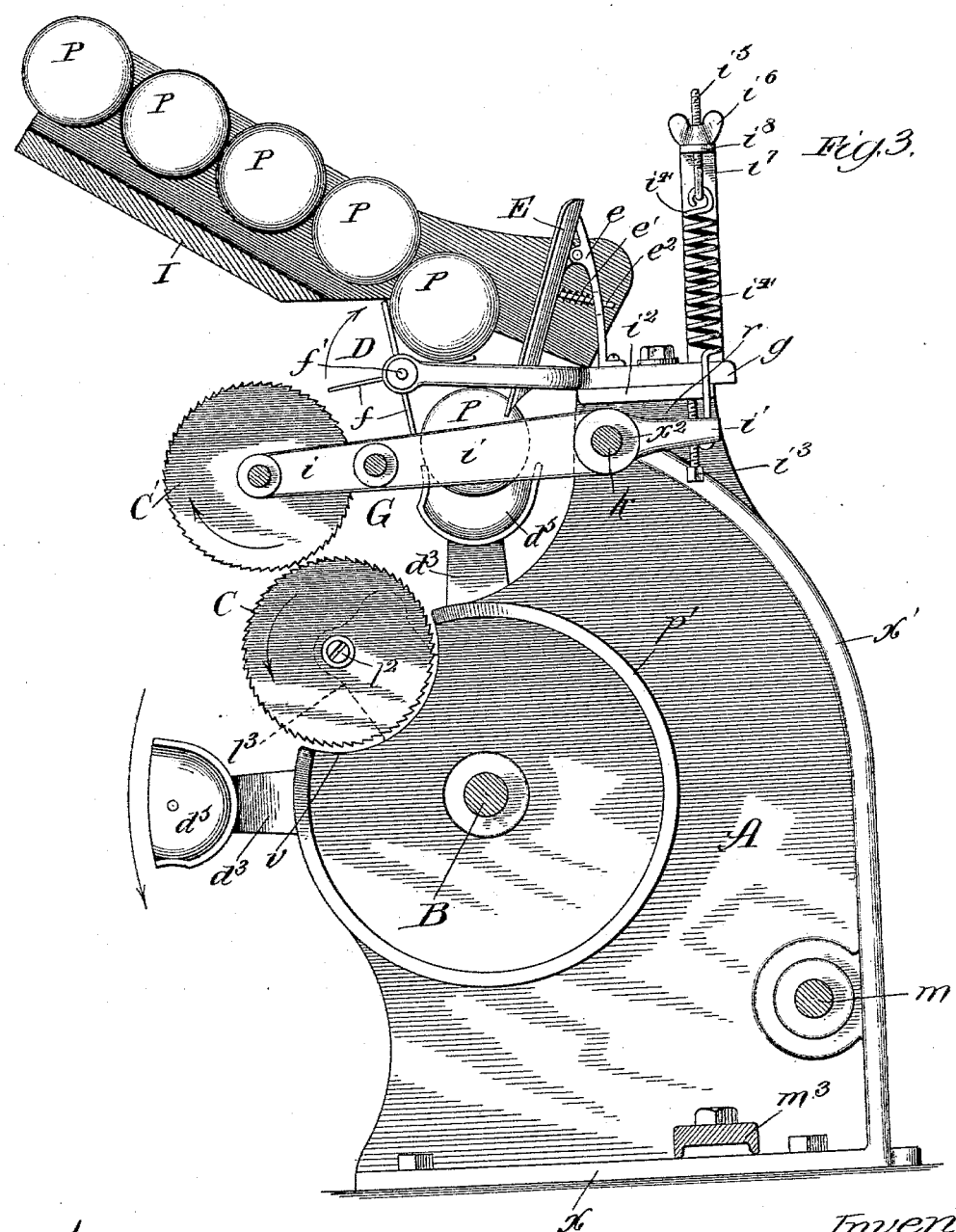

Referring to the accompanying drawings, Figure 1 shows my improved machine by a partly broken view in side elevation. Fig. 2 is a similar view of the opposite side of the machine; Fig. 3, a section taken at the line 3 on Fig. 4 and viewed in the direction of the arrow; Fig. 4, a section taken at the line 4 on Fig. 1 and viewed in the direction of the arrow; Fig. 5, a view in front elevation of the automatic feed device; Fig. 6, a section taken at the line 6 on Fig. 5 and viewed in the direction of the arrow, showing the trip mechanism for controlling the feed; and Fig. 7, a diagram of the cams as represented on a flat surface.

A is the body of the machine, which may be cast entire in one piece, and is preferably of the form shown, involving a vertical plate flanged at its base, as shown at $x$, and along its back, as shown at $x'$, the flanges $x'$ being curved in a forward direction toward their upper end, where they terminate in bosses $x^2$, above which the plate is extended to form a bearing $r$, and below which are formed, at opposite sides of the body of the plate, flanges describing almost complete circles and having their outer edges formed into corresponding cams $p$ and $p'$.

B is a rotary shaft passing through the plate A at the centers of the circular cams $p$ and $p'$ and supported in a bearing $o$, formed on the plate. I intend the shaft to be driven by a suitable motor or by foot or hand power, means for the last-named purpose being shown in the form of a crank-wheel $n$ on one end of a shaft $m$, passing through a bearing in the lower part of the plate A and carrying on its opposite end a pinion $m'$, (see Fig. 2,) meshing with a larger idler $m^2$, journaled in suitable bearings $m^3$ on the base of the bed and in turn meshing with a large cog-wheel B', secured to the adjacent end of the shaft B. A cog-wheel $B^2$ is secured on the opposite end of the shaft B and meshes with an idler-pinion $l'$, journaled on the plate A and in turn meshing with a smaller pinion $l$ on a shaft $l^2$, journaled in an extension $l^3$, Fig. 3, of the plate and carrying a circular peripherally-serrated cutter C, to make room for which the adjacent edge of the plate is concaved, as shown at $v$. A rock-shaft $k$ is journaled in the bosses $x^2$ and carries a bifurcated arm $i$. Between the bifurcated ends of the arm $i$ is journaled, directly over or coincident with the cutter C, a similar rotary cutter C', the shaft $s$ of which carries a pinion $h'$, meshing with a larger idler $h^2$, journaled on the adjacent side of the arm $i$ and in turn meshing with a still larger and similarly-journaled idler $h$, which meshes with the cog-wheel B'. The rearward-projecting end $i'$ of the arm $i$ carries a set-screw $i^3$ for regulating the limit of downward movement of the arm by engaging at its upper end a stop $i^2$ on the extension $r$ of the plate A. (See Fig. 3.) A bifurcated arm $g$ is bolted to the upper side of the stop $i^2$ to extend forward therefrom, and it has journaled between the ends of the bifurcated portion the feed device D, comprising blades $f$, extending at uniform intervals radially from a sleeve $f^2$ on the shaft $f'$, with which the blades are parallel. The sleeve is caused to resist being turned by the weight of fruit on a blade by the tension device formed with the spring $f^3$. For resiliently controlling the upward movement of the cutter-carrying rocking arm $i$, I connect with its rear extension $i'$ one end of a spiral spring $i^4$, connected at its opposite upper end with a set-screw $i^5$, working in a bearing $i^8$ on the upper end of a vertical bar $i^7$, secured on the rear end of the arm $g$, the set-screw being provided with a wing-nut $i^6$ for adjusting the set-screw carrying it to increase or decrease the tension of the spring.

E is a resiliently-yielding concavo-convex stop-plate supported to extend obliquely downward and oppose the feed device D by being pivoted on an arm $e$, extending upward from the arm $g$ and controlled by a spring $e'$, confined between the arm $e$ and stop-plate and tending to force the latter outward, the spring surrounding a guide-pin $e^2$, extending from the back of the stop-plate through the upright arm.

On the opposite end portions of the main shaft B are fastened, to rotate with it, heads F and F', having short arms $d$ and $d'$, respectively, extending radially from them and bifurcated toward their outer ends, the arms being shown as four in number on each head, though they may be fewer or more, and equidistant apart. In the bifurcated ends of the arms $d$ and $d'$, respectively, are pivoted at their inner ends the fingers $d^3$ and $d^4$, which converge toward opposite sides of the plate A at their outer ends, where they carry the separable halves $d^5$ and $d^6$ of cups G. Springs $d^7$ bear against the outer sides of the radial fingers $d^2$ and $d^3$ toward their outer end, being suitably extended for the purpose from the arms F and F', as shown in Figs. 1 and 4. The finger $d^3$ adjacent to each half $d^5$ of each sectional cup G carries, extending at a right angle outward from its extremity, a trip-stud $c^2$, and into the path of these trip-studs there projects the lower section $c'$ of a jointed lever H, the upper section $c$ of which is fulcrumed at $w$ and bears at its lower end against a stud $w'$ or stop behind it on the section $c'$. On one end of the shaft $f$ of the feed device D is a loose disk $b$, eccentrically connected by a link $b'$ with the upper end of the lever-section $c$ and carrying a pivotal dog $b^2$, heaviest at its outer extremity, as indicated at $z$ in Fig. 6, to afford to its opposite hook end a tendency to engage with the spurs $a'$ of a spur-pinion $a$, secured rigidly upon the shaft $f'$, the spurs corresponding in number with the blades $f$ of the feed device D.

At I is shown a V-shaped feed-trough supported in inclined position to direct the fruit P to be cut and pitted, and which may be peaches, apricots, or the like, to the feed device D.

The operation is as follows: By turning the shaft B, as through the medium of the crank-wheel $n$, in the direction toward the cutters C and C' the latter are rotated in the directions indicated by the arrows in Fig. 3 by their described gear connections with the main shaft, and which are preferably such as to cause the upper cutter C' to rotate at a somewhat faster speed than the lower cutter C. With the rotating shaft B the radial spring-controlled fingers $d^3$ and $d^4$ are also rotated and with them the cup-sections $d^5$ and $d^6$. These latter are gradually separated or spread apart by the shape of the circular cams $p$ and $p'$, against which the fingers bear resiliently under the influence of their controlling-springs as each cup G approaches the feed device D and until it reaches the gap afforded by the omitted arc sections of the cams, on reaching which, immediately after passing the feed device, their springs force them together to clamp the fruit, say, a peach, (but not sufficiently far to unduly squeeze it owing to the provision of the nose-pieces $u$ at the inner ends of the fingers,) which is fed to the cup in the following manner: The peaches are supplied to the feed-trough I and run down it till the one in advance rests on a blade $f$ of the feed device D. When the trip-stud $c^2$ on a finger $d^3$ strikes the lower section of the trip-lever H, in clearing the latter it turns the lever in the direction to partially rotate the disk $b$, and with it the dog $b^2$, which, by engaging a spur of the spur-wheel $a$, partially rotates the shaft $f'$ to bring the blade $f$, on which a peach is resting, into a horizontal or somewhat below a horizontal position. This forces the peach against the spring stop-plate E, where it is held or clamped till the trip-stud on the next succeeding cup-section $d^5$ encounters the trip-lever H. Then the further turning of the shaft $f'$ lowers the blade $f$, against which the leading peach partially rests, to or toward a vertical position and releases the peach from the clamping effect of the plate E, permitting it to drop into the cup G, meantime brought into position to catch it, and to that end having its sections separated to their utmost limit. The next succeeding peach will then have rolled upon the precedingly adjacent blade $f$ and be clamped against the stop-plate E. As shown in Fig. 3, the feed device D is supposed to be just undergoing partial rotation, and one peach is represented as in the act of falling into a cup while the peach preceding it is on its way on a blade $f$, (which has not yet reached the horizontal or somewhat below the horizontal position referred to,) to be clamped against the plate E and held there till the next succeeding cup shall trip the feed to release that peach. It may also be stated in this connection that the purpose of the described jointed construction of the lever H is to cause the lower section $c'$ to yield, should the operator inadvertently turn the shaft B in the wrong direction, under the impact of a trip-stud $c^2$ in passing it and thus avoid turning the shaft $f'$ and consequent operation of the feed device. When the fruit has fallen into a cup G, by the continued rotation of the latter it is almost immediately brought to the gap in the cams, (shown by the space in them in Fig. 7,) when the springs of the cup-sections force them together to firmly clamp the fruit, and while it is so held the continued motion of the cup carries the fruit between and past the rotating cutters C and C'. These divide the fruit in halves, the cutter C' yielding in an upward direction against the resistance of the spring $i^4$, which is overcome by the unyielding pit or stone to make room for the passage of the latter. The action of the rotary serrated disk cutters is, besides severing the fruit, to discharge the pit or stone in a forward direction, and this action is the better insured by the faster motion of the upper cutter. As soon as the cut has been extended quite around the fruit to completely sever it the fingers $d^3$ and $d^4$, carrying the cup in which the fruit is contained, again encounter the cams $p$ and $p'$, which gradually, in the continued rotation of the fingers, spread them apart, thus separating the cup-sections, till, when they reach about the position of the lowermost of the two cups represented in Fig. 3, the fruit-sections drop out into a basket or other suitable receptacle. (Not shown.) From the point at which a cup drops its sectional fruit contents till it again approaches more or less near to the point of receiving another peach or the like I prefer that the form of the cams shall be such as to permit the springs $d^7$ to close the cup-sections, which are opened, as described, when the cup has reached its receiving position. In this manner each of the series of cups in turn receives its load, clamps the fruit, and carries it between the cutters, which sever it with a smooth cut into sections, dislodge and discharge the pit or stone, and discharge the fruit-sections; and, as will readily be appreciated, the action of the machine is rapid, reliable, and accurate. Of course the dimensions of the cups may be varied according to the size of the particular species of fruit they are designed to hold; but their construction adapts them to operate equally well on different sizes of the same kind and even of different kinds of fruit.

The details shown and described of my improved fruit cutting and pitting machine are the best known to me and are believed to be best adapted for the purpose of the machine. I do not, however, wish to be understood as intending to limit my invention to the particular details, for they may be variously departed from, or some of them may be altogether omitted, without thereby effecting a departure from the principle of my invention.

What I claim as new, and desire to secure by Letters Patent, is—

1. In a fruit cutting and pitting machine, the combination with a pair of coöperating rotary cutters, of a rotary shaft, a cup formed in separable sections carried by the shaft through a circular path concentric with said shaft and extending between the cutters, and cam mechanism for opening and holding open the sections at different points in said path, substantially as described.

2. In a fruit cutting and pitting machine, the combination with a pair of coöperating rotary cutters, of a rotary shaft carrying near its opposite ends coöperating members of pairs of radially-extending resilient fingers, each pair carrying a cup formed in separable sections and said cups rotating with the shaft through a circular path extending between the cutters, and cam mechanism in the path of said fingers for separating the members of the pairs thereof to open and hold open the cup-sections at different points in said path, substantially as described.

3. In a fruit cutting and pitting machine, the combination with a pair of coöperating rotary cutters, of a rotary shaft carrying near each of its opposite ends a radially-extending series of arms having pivotally fastened to them spring-controlled fingers carrying at their outer ends cup-sections forming cups rotating with the shaft through a circular path extending between the cutters, and cam mechanism in the path of said fingers for forcing and holding them outward against the resistance of their controlling-springs and thereby separating the cup-sections at different points in said path, substantially as described.

4. In a fruit cutting and pitting machine, the combination with a pair of coöperating peripherally-serrated cutters C and C', of a rotary shaft B with which the cutters are geared, heads F and F'' near opposite ends of the shaft and having radial arms $d$ and $d'$, spring-controlled fingers $d^3$ and $d^4$ pivotally connected with said arms and carrying at their outer ends sections $d^5$ and $d^6$ forming cups H rotated by the shaft in a circular path extending between the cutters, and cams $p$ and $p'$ against which said fingers bear resiliently under the tension of their controlling-springs, substantially as and for the purpose set forth.

5. In a fruit cutting and pitting machine, the combination with a pair of coöperating rotary cutters, of a rotary shaft, a cup formed in separable sections carried by the shaft through a circular path extending between the cutters, cam mechanism for opening and holding open the sections at different points in said path, and an automatic feed for the fruit provided with trip mechanism actuated from a cup-section in traversing said path, substantially as described.

6. In a fruit cutting and pitting machine, the combination with a pair of coöperating rotary cutters, of a rotary shaft, a cup formed in separable sections carried by the shaft through a circular path extending between the cutters, cam mechanism for opening and holding open the sections at different points in said path, an automatic feed device for the fruit, comprising a rotary shaft having blades extending from it and provided with means for rotating it, and trip mechanism actuated from a cup-section in traversing said path to operate said means to partially rotate the blade-carrying shaft, substantially as described.

7. In a fruit cutting and pitting machine, the combination with a pair of coöperating rotary cutters, of a rotary shaft carrying near its opposite ends coöperating members of pairs of radially-extending resilient fingers, each pair carrying a cup formed in separable sections and said cups rotating with the shaft through a circular path extending between the cutters, trip-studs on said fingers, and cam mechanism in their path for separating the members of the pairs of fingers to open and hold open the cup-sections at different points in said path, a feed device comprising a rotary shaft having blades extending from it and provided with means for rotating it, trip mechanism engaging with said means and extending into the path of said trip-studs, and a resiliently-supported clamp-plate opposing said feed device, substantially as described.

8. In a fruit cutting and pitting machine, the combination with a pair of coöperating rotary cutters, of a rotary shaft carrying near its opposite ends coöperating members of pairs of radially-extending resilient fingers, each pair carrying a cup formed in separable sections and said cups rotating with the shaft through a circular path extending between the cutters, trip-studs on said fingers and cam mechanism in their path for separating the members of the pairs of fingers to open and hold open the cup-sections at different points in said path, a feed device comprising a rotary shaft having blades extending from it and carrying a spur-wheel and, loosely, a disk carrying a dog to engage the spur-wheel, a trip-lever linked eccentrically with said disk and extending into the path of said trip-studs, and a resiliently-supported clamp-plate opposing said feed device, substantially as described.

9. A fruit cutting and pitting machine comprising, in combination, a body A formed with circular cams $p$ and $p'$ and carrying a rotary shaft B, coöperating rotary cutters C and C' geared to said shaft and supported to yield one with relation to the other, coöperating members of pairs of radially-extending resilient fingers bearing against said cams, each pair carrying a cup G formed in separable sections and said cups rotating with the shaft through a circular path extending between the cutters, trip-studs on said fingers, a feed device comprising a rotary shaft $f'$ carrying blades $f$ on a sleeve $f^2$, a spur-wheel $a$ on said shaft and a disk $b$ thereon carrying a dog $b^2$, a trip-lever H connected by a link $b'$ with the disk and extending into the path of the trip-studs, a resiliently-supported stop-plate E opposing said feed device, and a guide-trough I leading to the feed device, the whole being constructed and arranged to operate substantially as described.

JACOB F. REHM.

In presence of—
M. J. FROST,
J. H. LEE.